United States Patent [19]

Dibble

[11] Patent Number: 5,111,036
[45] Date of Patent: May 5, 1992

[54] SHUTTER APPARATUS

[75] Inventor: John G. Dibble, Ridgecrest, Calif.

[73] Assignee: The United States of America as represented by the Secretary of the Navy, Washington, D.C.

[21] Appl. No.: 664,897

[22] Filed: Mar. 4, 1991

[51] Int. Cl.⁵ ............................................. H01J 31/50
[52] U.S. Cl. ........................... 250/214 AL; 250/201.1; 354/456
[58] Field of Search ......... 250/201.1, 214 AL, 214 B; 358/220; 354/76, 268, 456

[56] References Cited

U.S. PATENT DOCUMENTS 2,976,758  3/1961  Parker ................................ 250/201.1
4,960,988 10/1990  Simms ............................ 250/214 AL Primary Examiner—Carolyn E. Fields
Attorney, Agent, or Firm—Harvey A. Gilbert; Melvin J. Sliwka; John L. Forrest, Jr.

[57] ABSTRACT

An apparatus for protecting the image recording media in a tracking camera from destructive illumination. The apparatus includes a shutter assembly mounted between the lens and the camera and a sensor assembly mounted in juxtaposition with the camera so that a sensor at one end of the tube in the sensor assembly detects destructive illumination before it impinges on the lens. The sensor causes a signal to be passed through circuitry connecting to the shutter assembly, activating a rotary solenoid which moves a blade to an interrupting position between the lens and the camera until no further destructive illumination impinges on the sensor. The shutter blade return to a non-interrupting position when the sensor no longer receives destructive illumination.

10 Claims, 3 Drawing Sheets

SHUTTER APPARATUS

The present invention is a shutter apparatus and more particularly a shutter apparatus automatically activated by intense light to interrupt the path between the source of such light and a receiving sensor, such as a vidicon or a human eye, that would otherwise be damaged or destroyed.

BACKGROUND OF THE INVENTION

Radars and other instrumentation and devices used in the normal target tracking environment are frequently mated with optical viewing and monitoring systems. The optical viewing and monitoring systems are used to obtain direct and real-time observations of the spatial areas being illuminated or sensed by the radars or sensors respectively. In such applications the optical systems which may include those employing vidicons or similar devices that are susceptible to being damaged by impingement of sunlight or other intense and destructive radiation require protective measures. In a specific application, for example, where a vidicon camera is mated to a radar or tracking camera, it is necessary to maintain the vidicon observation and recording of the spatial area being covered by the radar without damage to the vidicon tube. If the vidicon camera is not protected, the phosphors in the vidicon tube can be permanently burned and destroyed. If the vidicon camera is thus permanently disabled the camera is a financial loss and, since the test involving the use of this equipment must be scrubbed and rescheduled without prior warning, substitute tests cannot be inserted in the schedule hole caused by the scrubbed test and a very expensive test opportunity time slot is lost. Total cost of financial loss alone may be substantial.

SUMMARY OF THE INVENTION

It is thus an object of the present invention to provide a means of sensing the impending presence of high intensity, destructive light and then interrupting the light path between a lens and a light sensor only until the sensor destructive light is beyond the light path.

It is a further object of the present invention to provide an automatic means for interrupting the light path, between a lens communicating sensor-destructive high intensity light, to a sensor and the sensor.

It is yet another object of the present invention to provide a movable and adaptable means for interrupting a sensor-destructive high intensity light in a variety of lens to sensor light paths in diverse camera configurations.

The present invention is a self-contained shutter assembly with a co-located and juxtapositioned sensor assembly. The invention is able to detect sensor destructive radiation such as high-intensity light, for example, sunlight, as the vidicon camera being protected by the invention moves in conjunction with the tracking radar with which it is associated to view a spatial area which will expose it to the destructive radiation. The invention senses the impending presence of the destructive radiation immediately in time and space before it impinges upon the lens of the vidicon camera being protected. The invention sensor causes a signal to be generated which in turn causes a shutter blade inside the shutter assembly located between the camera lens and camera body to interrupt the light path between the lens and the vidicon tube within the camera. When the destructive light or radiation is no longer within the field of view of the invention sensor, its signal diminishes until it is extinguished, causing the shutter blade in the invention to move out of the light path between the camera lens and vidicon tube so that vidicon image recording is resumed to provide coverage of spatial areas being illuminated by the tracking radar or similar device accompanied by the vidicon camera.

The invention is adaptable to a variety of lens and camera combinations and it has a clearly demarcated field of view for its sensor. The combination of response time and field of view are such that the invention can be used for a broad spectrum of applications.

The above objects, benefits, and advantages of the present invention are obtainable with the present invention in a variety of configurations. Although the light path interruption is described by discussion of an electromechanical means, electrooptical, electrochemical, and electrocrystal techniques can also be employed.

DRAWINGS

DETAILED DESCRIPTION

Figure 1:
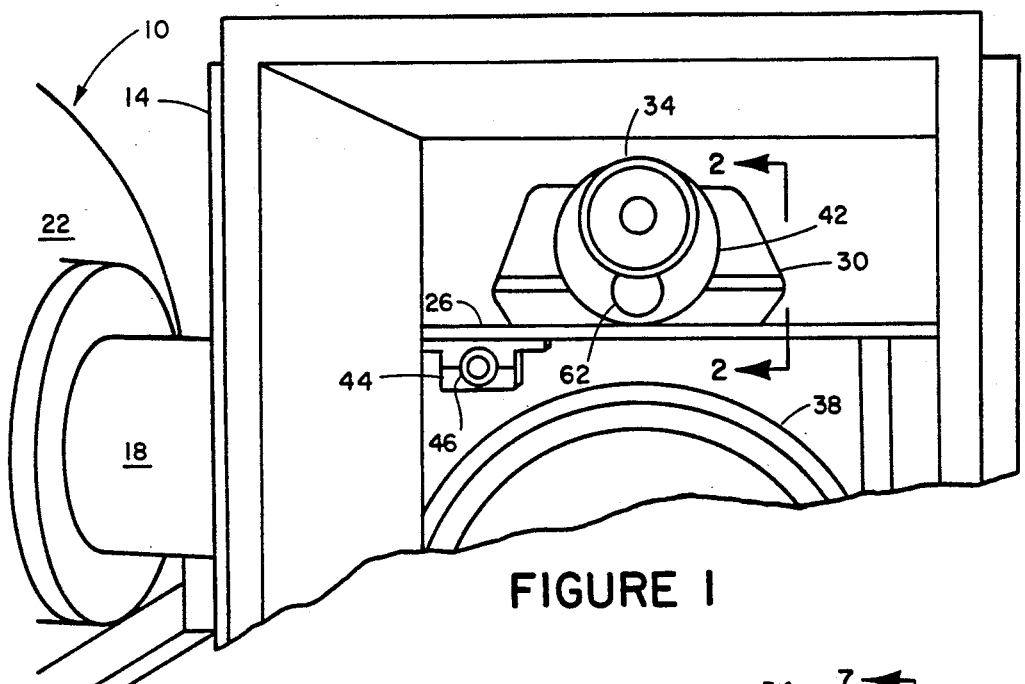
FIG. 1 is a perspective view of the invention employed with cameras mounted in juxtaposition with a tracking radar unit.

Referring to FIG. 1 the present invention is a shutter apparatus used in conjunction with a tracking radar 10 having a camera housing 14 connected by means of a trunion 18 to an elevation motor cover 22 integral to the radar 10. A mounting plate 26 supports a tracking camera 30 such as a vidicon camera bearing a wide-angle lens 34, and a tele-photo lens 38. Typically a 150 mm lens is used for a wide-angle lens and a 1725 mm lens is used as a telephoto lens for this type of tracking application. The camera 30 is used to record the spatial orientation and view concurrently with the sweep and spatial illumination of the radar 10 with which it is employed.

Figure 7:
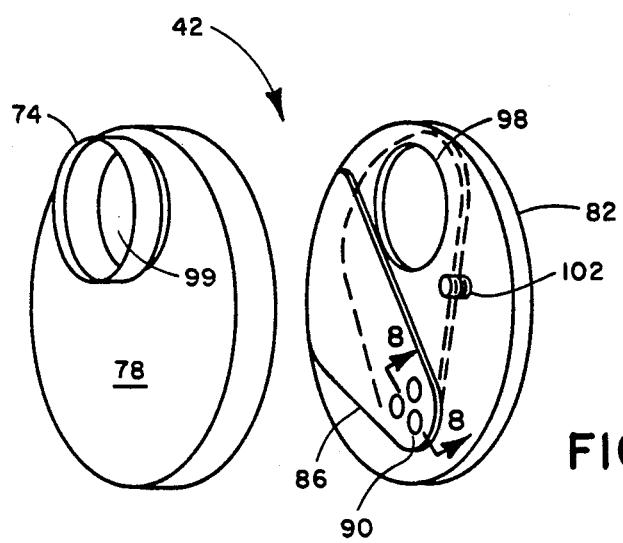
FIG. 7 is a perspective view of the opened shutter assembly of the present invention.
Figure 3:
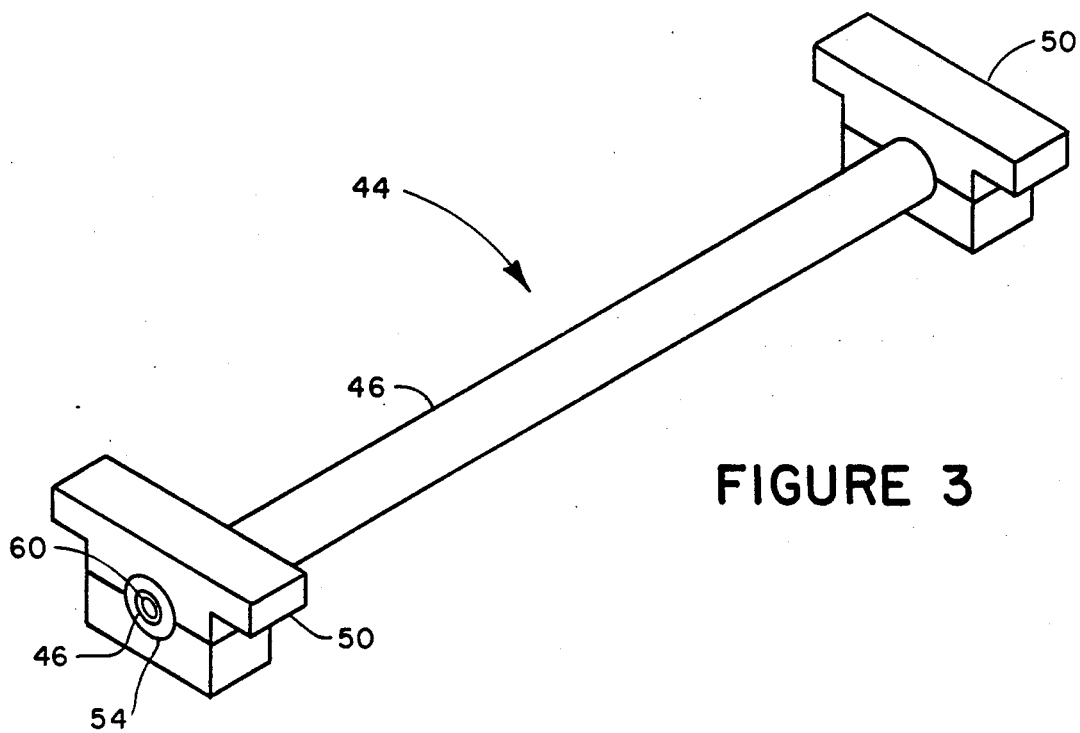
FIG. 3 is a perspective view of the sensor assembly of the present invention.

The shutter apparatus of the present invention is comprised of the shutter assembly 42 shown in FIG. 7 and the sensor assembly 44 shown in FIG. 3 which are co-located in operational juxtaposition on the mounting plate 26 in the camera housing 14, as shown in FIG. 1.

The sensor assembly 44 is comprised of the sensor tube 46 having its end extremities contained within the mounting adapters 54. The mounting adapters 54 may be positioned at intermediate points on the sensor tube 46 as mounting circumstances necessitate. The set screws 56 shown in FIG. 5 and 6 are used to secure the mounting adapters 54 to the ends of the sensor tube 46.

Figure 4:
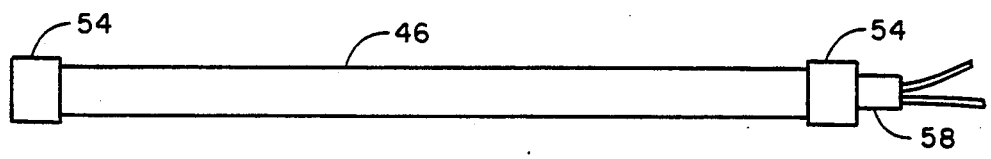
FIG. 4 is a perspective view of the sensor tube of the present invention.
Figure 5:
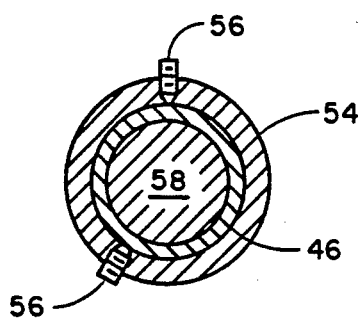
FIG. 5 is a sectional view taken along line 5—5 in FIG. 9 looking through the sensor tube from within the sensor toward the open end of the sensor tube of the present invention.
Figure 6:
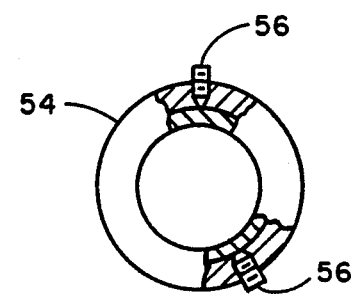
FIG. 6 is a partial sectional view taken along line 6—6 in FIG. 9 looking through the sensor tube from its open end towards the sensor end of the tube.
Figure 9:
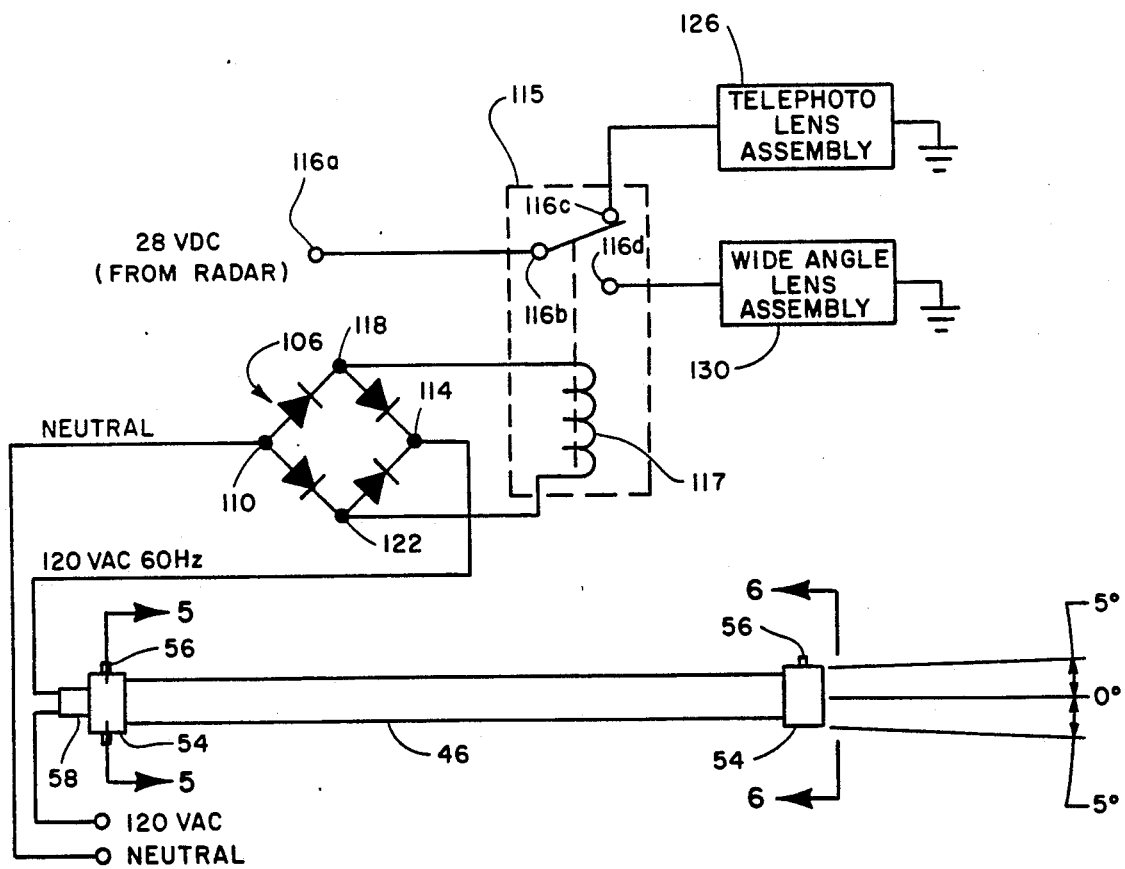
FIG. 9 is a schematic diagram of the present invention showing electrical connections.

FIG. 5 is the view looking from a plane through the sensor 58 towards the aperture 60 end of the sensor tube 46. FIG. 6 is the view looking through the aperture 60 end of the sensor tube 46 toward the sensor 58. The ends of the sensor tube 46 within the mounting adapters 54 are secured within the mounting brackets 50 shown in FIG. 3 to the mounting plate 26 in operational juxtaposition with the camera 30, as shown in FIG. 1. The aperture 60, visible in FIG. 3 is at one end of the sensor tube 46 from the light sensing means, sensor 58. See FIGS. 3 and 4. The positioning of the sensor assembly 44 upon the mounting plate 26 relative to the camera 30 is set such that the sensor picks up the potentially damaging illumination, such as direct sunlight, immediately before it has a chance to impinge upon the lens 34 of the camera 30, as seen in FIG. 1. As shown in FIG. 9, there is an approximate field of view of 10° across the aperture 60 end of the sensor tube 46. In preferred embodiments the aperture 60 of the tube 46 has been 0.5 inch and the length of the tube is 30 inches. The field of view has been 8°-10°. A larger and smaller aperture within the range of 8°±2° may be desirable for particular applications.

Figure 2:
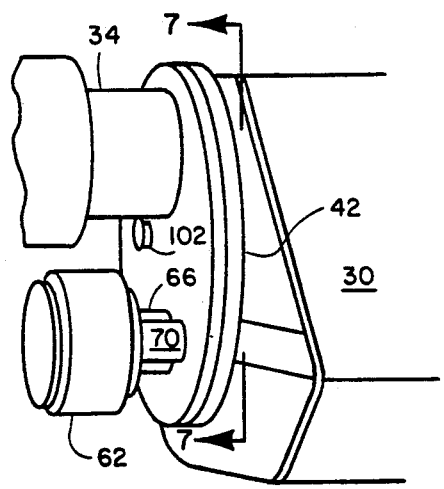
FIG. 2 is a perspective view of the shutter assembly of the invention mounted on a camera.

The details of the shutter assembly 42 are shown in FIG. 7. The shutter assembly 42 is comprised of the shutter housing 78 to which a lens mounting adapter 74 is affixed about the aperture 99 and a mating shutter assembly cover 82. In a preferred embodiment the lens mounting adapter 74 is a "c" mount. The shutter assembly cover 82 has an aperture 98 which is centered about an axis normal to the plane of the aperture 98 and spaced parallel from the aperture 99 in the shutter assembly housing 78. The shutter blade 86 is mounted pivotally at one end by means of the screws 90, seen in FIGS. 7 and 8, to the shaft adapter 66 coaxially surrounding the shaft 64 of the rotary solenoid 62. The opposite end of the shutter blade 86, which is normally disposed in a rest position away from the aperture 98, is rotatably movable about its opposite pivotally mounted end such that when activated it moves arcurately until it fully covers the aperture 98 interrupting the light path therethrough and rests against the stop 102, its active or activated position, until permitted to rotatably return to its rest or inactivated position as shown in FIG. 7. The stop 102 extends normal to the inner planar surface of the shutter assembly cover 82 at a point in the rotational path of the shutter blade 86 that permits it to interfere with further travel of the blade 86 when it fully interrupts the light path through the aperture 98. The head of the screw or bolt used for the stop 102 is visible in FIG. 2. Also in FIG. 2, the rotary solenoid 62 is shown mounted by means of the bolt 70, one on each side diametrically from each other, of the shaft adapter 66. In FIG. 2, the shutter blade 86 is not visible since it is contained within the shutter assembly 42 mounted between the lens 34 and the camera 30.

Figure 8:
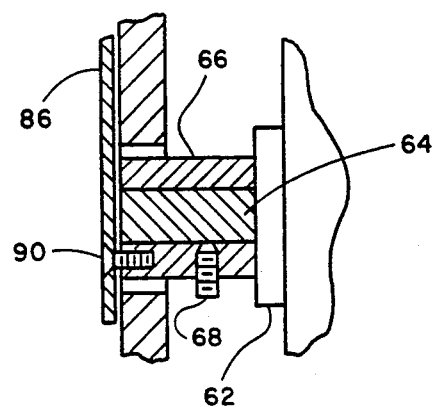
FIG. 8 is a sectional view along line 8—8 in FIG. 7.

FIG. 8 shows the mounting of the shutter blade 86 to the shaft adapter 66 surrounding the solenoid shaft 64. The shutter blade mounting screw 90 secures the blade 86 to the shaft adapter 66. The shaft adapter 66 is secured immovably to the solenoid shaft 64 on the set screw 68.

The electrical circuit between the sensor 58 and the shutter blade 86 is shown in FIG. 9. The sensor 58 is connected in the 120 VAC line which along with its neutral is connected to the 4 - diode bridge 106 at points 114 and 110, respectively. The two ends of the coil 117 in the relay 115 are connected to points 118 and 122 of the bridge 106. The relay arm 119 extends from its pivot contact 116b, which carries 28 VDC from the radar 10. The relay arm 119 connects between the contacts 116b and 116c when the sensor 58 is inactive. The relay contact 116c, when the relay arm 119 is in its normally closed condition connects externally from the relay 115 to the telephoto lens assembly 126. The 28 volts DC carried by the relay arm 119 in the normally closed condition may or may not be used in the telephoto lens assembly 126 as the lens itself dictates. It may be used, for example, to operate the telephoto lens iris. The relay contact 116d, the normally open relay condition, connects externally from the relay 115 to the wide-angle lens assembly 130 which contains the rotary solenoid 62 to which it is directly connected.

OPERATION

In operation, with reference to FIG. 1 the radar 10 moves to maintain tracking of a target being illuminated. As the radar 10 moves, the camera housing 14 which is affixed to the radar 10 through the trunion 18 attached to the elevation motor cover 22 on the radar 10 moves with it. This permits the camera 30 and any others in the camera housing 14 to view and record in real time the image of the target in relation to the target environment being illuminated by the radar 10. As the radar 10 tracks a target it occasionally will be pointed in the direction of the sun or other high-intensity source of illumination destructive to the camera viewing and recording media. Thus, for example, a vidicon camera may have its vidicon tube permanently damaged by the high-intensity illumination impinging on the tube phosphors.

In the present invention the sensor tube is affixed to the mounting plate 26 in the camera housing 14 in operational juxtaposition with the camera 30 with which it will be employed. Thus, depending on the field of view of the particular lens, the type of camera with which it is used, and the type of destructive illumination to which the sensitive camera viewing and recording elements will be exposed, the sensor tube 46 is positioned on the camera mounting plate such that the sensor 58 will detect the destructive illumination immediately before it comes into the camera's field of view and cause interruption of such illumination until it is no longer in the camera's field of view. It is intended that the sensor 58 provide a 5° angle of protection to the camera. That is, the detector is intended to cause interruption of the destructive illumination at least 5° before the illumination reaches the field of view of the camera. The interruption of the destructive illumination is intended to continue until it is 5° beyond the camera's field of view. It should be noted in FIG. 1 that the sensor tube 46 is located off to one side or the other of the camera 30 depending on which way the radar is turning so that the sensor sees the destructive illumination before it impinges on the camera lens 34.

When the destructive illumination enters the aperture 60 of the sensor tube 46 the sensor 58 in FIG. 9 becomes operative as a resistance in the hot side of the 120 volt AC power source. The change of AC signal is rectified by the bridge 106 and the resulting signal is fed directly to the coil 117 of the relay 115. This signal causes the relay 115 to become operative such that the relay arm 119 is caused to move from its inactive position at 116c which brought 28 VDC to the telephoto lens assembly 126 to its active position at 116d. When the relay arm 119 makes contact with the relay contact 116d, 28VDC is supplied to the wide angle lens assembly 130, and more particularly to the rotary solenoid 62 therein. This causes the shaft adapter 66 of the rotary solenoid 62 shown in FIG. 2 to rotate causing the shutter blade 86 to move rotatably until it makes contact with stop 102. The blade 86 is then in a blocking position between apertures 98 and 99 within the shutter assembly 42, thus interrupting the flow of destructive illumination therebetween until such illumination ceases to enter into the sensor tube 46. At that time the sensor 58 ceases to cause the signal change required to main the rotary solenoid 62 active. The solenoid 62 then permits the shutter blade 86 to rotate away from the stop 102 until it returns to its rest position and no longer occupies its blocking position between the two apertures 99 and 98. The camera 30 is thus protected during the time the blade 86 blocks the apertures 98 and 99 in the shutter assembly 42 mounted between the lens 34 and the camera 30.

Although many variations in selection and arrangement of components may now be envisioned by those skilled in the art in implementing the present invention a preferred embodiment included a relay 115 model number RP 7633 G76 from C.P. Clare and Co. The bridge rectifier 106 was a model FWL 400 SI 8236. The sensor 58 used was a photosensor model PES-905-HN100-P from Central Engineering Co.

Still other variations of my invention may now be implemented without falling beyond the scope and breadth of coverage of my claims which follow:

What I now claim as my invention is:

1. An apparatus for interrupting the light path between a lens and a camera, said apparatus comprising:
    a means for interrupting said light path mounted between said lens and said camera;
    a means for sensing destructive illumination and generating a signal indicating detection, said means for sensing and generating mounted in juxtaposition with said interrupting means so that destructive illumination impinges upon said sensing and generating means before it impinges on said lens; and
    a means connected between said sensing means and said interrupting means for transferring said signal from said sensing and generating means to said interrupting means for making said interrupting means operative as long as said signal is provided.

2. The apparatus of claim 1 wherein said means for interrupting said light path, comprises:
    a housing having apertures in, and centered about an axis normal to, each of two opposing ends, said apertures providing said light path when not obstructed, said housing removably mounted between said lens and said camera so that said apertures are centered in said light path;
    a means, connected to said means for transferring said signal, and mounted between said housing and the rotatably mounted end of an elongated blade for positioning said blade between said apertures to totally interrupt the light path only for as long as said signal is generated by said sensing means; and
    said elongated blade having one end rotatably mounted to said means for positioning, and an opposite cantilevered end having a width laterally in the directions of rotation adequate to permit total interruption of said light path between said apertures.

3. The apparatus of claim 2 wherein said means for positioning said blade is a rotary solenoid.

4. The apparatus of claim 2 further comprising a means for stopping and limiting the rotational travel of said blade when said cantilevered end is positioned within said housing to totally interrupt said light path, said stopping means extending from, and normal to either of said two opposing housing ends and normal into the path of rotational travel of said blade.

5. The apparatus of claim 1 wherein said means for sensing destructive illumination and generating a signal is a sensor assembly comprising:
    an elongated sensor tube having an aperture in one end, and a destructive illumination sensor affixed within the opposite end of said tube and connected to said means for transferring said signal.

6. The apparatus of claim 5 wherein the length of said tube and the size of said aperture are such to produce a 10° + (plus) or − (minus) 2° field of view for said sensor mounted in said tube.

7. The apparatus of claim 1 wherein said means from transferring said signals, comprises:
    a four-diode bridge circuit having a power supply, one side of which is connected to the joined anodes of two adjacent diodes and the other side of which is connected to the joined cathodes of the other two bridge diodes, and said sensing means connected in one side of said input, and the output of said bridge connected between the two points on opposite sides of said bridge where the cathode of one diode joins the anode of the adjoining diode; and
    a relay having its coil connected across the output of said bridge, a switching arm connected to a source of 28 VDC, a normally closed output, and a normally open output connected to said means for interrupting said light path.

8. An apparatus for interrupting the light path between a lens and a camera, said apparatus, comprising:
    a housing having a first planar-shaped end spaced from and parallel to a second planar-shaped end, each of said ends having an aperture centered about the axis normal to said ends;
    a means for interrupting said light path, said means disposed rotatably within said housing between a first and noninterrupting rest position and a second fully interrupting active position between said apertures, said means requiring an activating signal; and
    a means for sensing light and producing an activating signal for operating said means for interrupting said light path, said sensing means located in juxtaposition with said camera and lens so that destructive illumination impinges upon said sensing and producing means before it can impinge on said lens, said sensing and producing means being connected electrically to said interrupting means.

9. The apparatus of claim 8 wherein said means for interrupting said light path, comprises:
    a means for producing rotary motion, said producing means being mounted to one of said planar-shaped housing ends and having a rotary shaft extending within said housing from said one end, and an elongated blade having one end affixed to said rotary shaft, an opposite, cantilevered end having a width sufficient to fully interrupt the light path between said apertures when so moved by said means for producing rotary motion.

10. The apparatus of claim 9 wherein said means for producing rotary motion is a rotary solenoid.

* * * * *